(12) United States Patent
Bernzen

(10) Patent No.: US 8,036,794 B2
(45) Date of Patent: Oct. 11, 2011

(54) METHOD AND DEVICE FOR PREVENTIVELY ACTUATING A VEHICLE OCCUPANT PROTECTION SYSTEM

(75) Inventor: Werner Bernzen, Ehningen (DE)

(73) Assignee: Daimler AG, Stuttgart (DE)

( * ) Notice: Subject to any disclaimer, the term of this patent is extended or adjusted under 35 U.S.C. 154(b) by 873 days.

(21) Appl. No.: 11/794,049

(22) PCT Filed: Dec. 8, 2005

(86) PCT No.: PCT/EP2005/013130
§ 371 (c)(1),
(2), (4) Date: Mar. 21, 2008

(87) PCT Pub. No.: WO2006/072327
PCT Pub. Date: Jul. 13, 2006

(65) Prior Publication Data
US 2008/0189016 A1      Aug. 7, 2008

(30) Foreign Application Priority Data

Dec. 24, 2004   (DE) .......................... 10 2004 062 482

(51) Int. Cl.
*B60R 21/013* (2006.01)
(52) U.S. Cl. ......................................... 701/45; 280/735
(58) Field of Classification Search .................. 701/45, 701/46, 47; 280/735; 340/438, 440
See application file for complete search history.

(56) References Cited

U.S. PATENT DOCUMENTS

| | | | | |
|---|---|---|---|---|
| 5,774,821 A | * | 6/1998 | Eckert | 701/78 |
| 5,862,503 A | * | 1/1999 | Eckert et al. | 701/78 |
| 6,941,212 B2 | * | 9/2005 | Sakata | 701/72 |
| 7,142,965 B2 | * | 11/2006 | Metzger et al. | 701/45 |
| 7,178,622 B2 | * | 2/2007 | Eberle et al. | 180/271 |
| 2006/0164227 A1 | | 7/2006 | Auer et al. | |

FOREIGN PATENT DOCUMENTS

| | | |
|---|---|---|
| DE | 101 21 386 C1 | 8/2002 |
| DE | 102 50 732 B3 | 4/2004 |
| DE | 103 33 169 A1 | 2/2005 |

OTHER PUBLICATIONS

International Search Report dated Mar. 29, 2006 w/English translation of pertinent portion (six (6) pages and Form PCT/ISA/237 w/English translation of pertinent portion (nine (9) pages) totaling (fifteen (15) pages).

* cited by examiner

*Primary Examiner* — Paul N Dickson
*Assistant Examiner* — Timothy Wilhelm
(74) *Attorney, Agent, or Firm* — Crowell & Moring LLP

(57) ABSTRACT

In a method and a device for preventively actuating a vehicle occupant protection means in a vehicle having a vehicle movement dynamics control system, the vehicle occupant protection elements can be activated before a collision time and thus placed in an operative position. An evaluation variable relating to a state of "oversteering" is monitored, and when the state of "oversteering" is identified the vehicle occupant protection elements are activated. The evaluation variable for monitoring the state of "oversteering" is determined by using a manipulated variable of the vehicle movement dynamics control system.

6 Claims, 1 Drawing Sheet

METHOD AND DEVICE FOR PREVENTIVELY ACTUATING A VEHICLE OCCUPANT PROTECTION SYSTEM

CROSS REFERENCE TO RELATED APPLICATIONS

This application is a National Phase of PCT International Application No. PCT/EP2005/013130, filed Dec. 8, 2005, which claims priority under 35 U.S.C. §119 to German Patent Application No. 10 2004 062 482.8 filed Dec. 24, 2004, the entire disclosures of which are herein expressly incorporated by reference.

BACKGROUND AND SUMMARY OF THE INVENTION

The invention relates to a method and a device for preventively actuating vehicle occupant protection elements in a vehicle, in particular reversible elements, which include a vehicle movement dynamics control system, in which an evaluation variable relating to a state of "oversteering" is monitored and when the state of "oversteering" is identified the vehicle occupant protection elements are activated.

The prior art, such as German Patent Document DE 101 21 386 C1 discloses a method for actuating a reversible vehicle occupant protection element in a vehicle with a sensor system which senses driving state data, and with a reversible vehicle occupant protection element which can be triggered before the collision time and thus placed in an operative position, wherein the driving state data is monitored with respect to a state of "emergency braking" and when a state of "emergency braking" is determined the vehicle occupant protection element is triggered. According to embodiments of the present invention, the driving state data is additionally monitored with respect to a state of "oversteering" and a state of "understeering" and when a state of "emergency braking" and/or "oversteering" and/or "understeering" is determined the vehicle occupant protection element is triggered. The direction from which a maximum hazard is to be expected is determined by using the states of "emergency braking", "understeering" and "oversteering", and the vehicle occupant protection element is actuated in such a way that the protective effect is provided according to the direction of maximum hazard.

In this embodiment, the state of "oversteering" is determined by evaluating the attitude angle which is determined from the wheel speeds, the yaw rate and the transverse acceleration. In an alternative embodiment, the state of "oversteering" is determined by evaluating the difference between an angle which describes a change in the actual direction of travel and the steering angle, with the angle which describes the change being determined from the wheel speeds, the wheel base, the transverse acceleration and/or the yaw rate. This difference corresponds physically to the setpoint yaw moment of the vehicle. The necessary evaluations are carried out in all cases by using a threshold value comparison, which includes a predefinable, fixed threshold value.

In this method, the determination of the variable which is to be evaluated for oversteering, that is to say the attitude angle or alternatively the difference in the angle which describes the change in the actual direction of travel and the steering angle, is relatively complex and in the case of the attitude angle the variable is additionally subject to a relatively imprecise estimation.

One object of the invention, therefore, is to provide an improved method and a device of the type described above by which it is possible to detect oversteering with little expenditure.

This and other objects and advantages are achieved by the method and apparatus are to the invention, for actuating occupant protection elements using a vehicle movement dynamics control system. In order to preventively actuate vehicle occupant protection elements, in particular reversible elements which can be activated before a collision time and thus placed in an operative position, an evaluation variable relating to a state of "oversteering" is monitored. When a state of "oversteering" is identified the vehicle occupant protection element is activated, wherein a manipulated variable is determined by a vehicle movement dynamics control system of the vehicle; and the evaluation variable for monitoring the state of "oversteering" is determined by using the manipulated variable.

The advantage of this method is that the manipulated variable of the vehicle movement dynamics control system has a particularly precise and sufficiently reliably determined variable in which essentially all the possible driving situations, for example for travel around steep bends and special driving maneuvers of the vehicle are taken into account. No measures are necessary for sensor calibration or the like since all the necessary sensor calibration and monitoring processes are carried out by the vehicle movement dynamics control system.

In one preferred embodiment, the manipulated variable corresponds physically to a setpoint yaw moment which is determined by the vehicle movement dynamics control system. This ensures that the evaluation variable also corresponds to the setpoint yaw moment. Therefore, a variable which has already been determined, such as the setpoint yaw moment of the vehicle movement dynamics control system, and which is determined particularly easily and quickly, is available for monitoring the state of "oversteering". In this example, a high value of the manipulated variable is an indicator of severe oversteering or of imminent severe oversteering of the vehicle.

The setpoint yaw moment is preferably a manipulated variable from which brake pressures which are to be applied selectively at individual wheels can be determined. This permits the vehicle occupant protection elements to be activated as a reaction to situations in which the brake pressures of individual wheels are corrected. Such corrections by the vehicle movement dynamics control system take place in particular in states of oversteering.

One advantageous embodiment provides that a value of an evaluation function of a fuzzy logic is determined for the manipulated variable as an intermediate variable. This permits stepless evaluation and actuation of the vehicle occupant protection elements. The evaluation function preferably has a value range from 0 to 1 or any other desired value range which corresponds to the physical variable and the measurement range of the manipulated variable.

In a further embodiment, a result of low-pass filtering of the intermediate variable is determined as an evaluation variable. The low-pass filtering is preferably carried out asymmetrically. In this exemplary embodiment, the low-pass filtering has a rapid rise and a slow decline. As a result, in the case of brief interventions, an activation signal which is present for a sufficiently long time is also made possible.

A preferred embodiment provides for the state of "oversteering" to be identified if the monitoring reveals that the evaluation variable exceeds a first threshold value, for example "1". Monitoring to determine whether the first threshold value of the evaluation variable is exceeded is a simple possible way of identifying the state of oversteering.

A further preferred embodiment provides for the state of "oversteering" to be rejected and for the triggered vehicle occupant protection elements to be deactivated if the monitoring reveals that the evaluation variable undershoots a second threshold value, for example "0".

For example, the first threshold value is higher than the second threshold value. As a result, a hysteresis is run through in relation to the activation and deactivation of the vehicle occupant protection elements.

It is advantageous if at least one of the threshold values is adapted as a function of at least one further parameter. This permits in particular the activating first threshold value to be adapted to the driving situation, for example to the speed of the vehicle. It is thus possible to model the sensation of risk of a user of the vehicle. The user generally feels safe at low speeds of the vehicle and low coefficients of friction so that the activating first threshold value can assume a relatively high value. At high speeds of the vehicle and high coefficients of friction, the subjective sensation of risk is generally more pronounced so that the triggering threshold value then advantageously assumes a lower value.

A lateral acceleration and/or a resulting overall acceleration and/or a coefficient of friction which is actually used and/or the speed of the vehicle are expediently used as a further parameter. At a high coefficient of friction, such an embodiment of the system of actuating a preventive-action vehicle occupant protection element can thus lower the first threshold value, which is assigned to a driving situation such as the state of "oversteering" which is critical in terms of transverse dynamics. This leads, in particular, at high speeds of the vehicle compared to a conventional preventive-action vehicle occupant protection system, to an increase in the number of activations of the vehicle occupant protection elements, as a result of which the acceptance of the preventive-action vehicle occupant protection system with a user of the motor vehicle is under certain circumstances increased.

The device according to the invention has a vehicle movement dynamics control system, a control unit, and vehicle occupant protection elements, which can be reversible. The exemplary control unit can determine an evaluation variable by using a manipulated variable which is determined by the vehicle movement dynamics control system, and to identify, by using the evaluation variable, whether a state of "oversteering" is present, and it being possible to trigger the vehicle occupant protection elements automatically if the control unit identifies the state of "oversteering". The manipulated variable of the vehicle movement dynamics control system preferably corresponds physically to a setpoint yaw moment.

In one particular embodiment, the control unit outputs a signal which corresponds to the identified state. In this way, the information about the state of "oversteering" is also available to other vehicle devices, for example for performing open-loop and/or closed-loop control of other operating functions of the vehicle.

The device preferably has a data bus, in which case the control unit transmits the signal onto the data bus. The information about the state of "oversteering" can thus be called via a standard interface.

Other objects, advantages and novel features of the present invention will become apparent from the following detailed description of the invention when considered in conjunction with the accompanying drawings.

BRIEF DESCRIPTION OF THE DRAWINGS

The invention will be explained in more detail below with reference to an exemplary embodiment.

In the drawings.

DETAILED DESCRIPTION OF THE DRAWINGS

Parts which correspond to one another are provided with the same reference symbols in all the figures.

Figure 1:
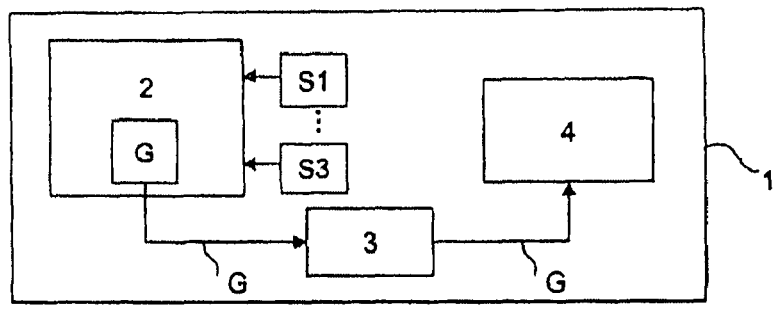
FIG. 1 is a block circuit diagram of a device according to the invention.

FIG. 1 is a schematic block circuit diagram of a vehicle 1 which is equipped with a vehicle movement dynamics control system 2. The vehicle 1 also has a reversible vehicle occupant protection element or elements 4, for example in the form of a seatbelt pretensioner, which is connected to a control unit 3. The control unit 3 is connected to the vehicle movement dynamics control system 2.

The vehicle movement dynamics control system 2 senses, among others, an actual yaw rate of the vehicle 1 by using a yaw rate sensor S1, and also determines a setpoint yaw rate of the vehicle 1 by using a steering angle sensor S2a in conjunction with a transverse acceleration sensor S2b and wheel speed sensors 3, for determining the speed of the vehicle and a model of the dynamics of the vehicle. From the difference between the setpoint yaw rate and the actual yaw rate, the vehicle movement dynamics control system 2 determines a manipulated variable G which corresponds physically to a setpoint yaw moment of the vehicle 1. The brake pressures which are to be applied selectively to the individual wheels can be determined by using the setpoint yaw moment. The vehicle movement dynamics control system 2 is active in particular when the vehicle 1 is oversteered since in this case the rear of the vehicle veers away and a dangerous driving state could occur.

According to the invention, the actuation of the vehicle occupant protection element 4 is carried out by using the control unit 3, in particular for the case of oversteering, by evaluating the manipulated variable G of the vehicle movement dynamics control system 2. A high value of the manipulated variable G is an indicator of severe oversteering or of imminent severe oversteering of the vehicle.

Figure 2:
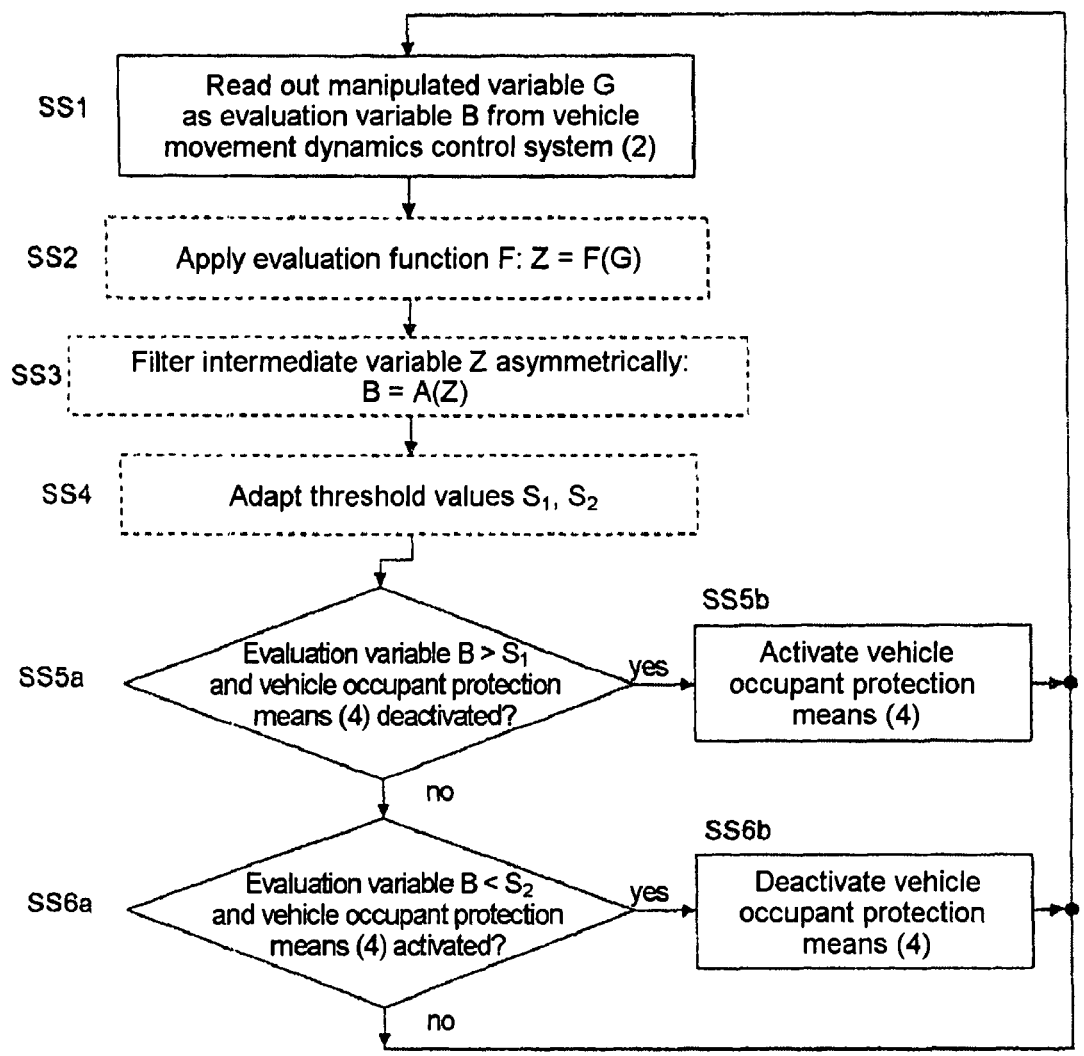
FIG. 2 is a flowchart of a method according to the invention.

FIG. 2 shows in this respect an exemplary flowchart of a method which is carried out by the control unit 3.

In step SS1, for example the manipulated variable G which corresponds physically to the setpoint yaw moment is read out of the vehicle movement dynamics control system 2 as an evaluation variable B. In step SS2, for example, an evaluation function F of a fuzzy logic is applied to the manipulated variable G, the evaluation function F permitting stepless evaluation. An intermediate variable Z=F(G) for the driving state of "oversteering" is thus obtained in a value range from 0 to 1, for example.

The intermediate variable Z can, as illustrated in step SS3, be filtered with an asymmetric low-pass filter A which has a rapid rise and a slow decline. This also gives rise to an activation signal which is present for a sufficiently long time, even in the case of brief interventions. As a result of this step SS3, an evaluation variable B according to:

$$B=A(Z)=A(F(G)) \qquad [1]$$

is made available.

In a further embodiment of the method, a first and a second threshold value $S_1$ and $S_2$ can be predefined in step SS4. The first threshold value $S_1$ specifies here that value for the evaluation variable B which, in the event of the first threshold value $S_1$ being exceeded, is used to identify the state of "oversteering" of the vehicle 1. The second threshold value $S_2$ is used to deactivate the vehicle occupant protection element 4 and to reject the state of "oversteering" if the value of the evaluation variable B undershoots the second threshold value $S_2$.

In this exemplary embodiment, the threshold values $S_1$, $S_2$ can be adapted as a function of further parameters. For example, the threshold values $S_1$, $S_2$ can be adapted as a function of one or more parameters, such as for example a lateral acceleration, a resulting overall acceleration, an actually utilized coefficient of friction and/or the velocity. Alternatively, the two threshold values $S_1$, $S_2$ can be permanently predefined.

In order to monitor the threshold values $S_1$, $S_2$, in step SS5$a$ it is checked whether the evaluation variable B exceeds the first threshold value $S_1$ and whether the vehicle occupant protection element 4 is deactivated. If both conditions apply, in step SS5$b$ the vehicle occupant protection element 4 is activated and the method is begun anew with step SS1. Otherwise, the method continues with step SS6$a$.

In step SS6$a$ it is checked whether the evaluation variable B undershoots the second threshold value $S_2$, which is, for example, lower than the first threshold value $S_1$, and whether the vehicle occupant protection element 4 is already activated. If both conditions apply, in step SS6$b$ the reversible vehicle occupant protection element 4 is deactivated. In both cases, the method is then carried out anew starting with step SS1.

Since the second threshold value $S_2$ is lower than the first threshold value $S_2$, a switching hysteresis is produced for the activation of the vehicle occupant protection element 4 in the case of a state of oversteering.

Expediently, if the vehicle 1 has a plurality of vehicle occupant protection elements 4, individual vehicle occupant protection elements 4, or a plurality thereof, or all of the elements 4 can be activated or deactivated by using the method according to the invention if a state of oversteering is identified with the evaluation variable B.

In steps SS5$a$ and SS6$a$ it is, for example, possible to use a last identified state as an alternative to the checking of the activation of the vehicle occupant protection element 4, in which case after step SS5$b$ the state of "oversteering" is stored as the last state, and after step SS6$b$ a state of "not oversteered" is stored as the last state, respectively.

A signal which corresponds to the identified state of "oversteering" or "not oversteered" can, for example, be output and transmitted onto a data bus of the vehicle 1 in the form of an individual control bit, so that the information relating to this state is also available to other vehicle devices for performing open-loop and/or closed-loop control of other operating functions of the vehicle 1. In one exemplary embodiment, the vehicle occupant protection element 4 is connected, for example, to the control unit 3 via the vehicle bus and is activated or deactivated by using the signal. Likewise, it is possible to transmit the manipulated variable G of the vehicle movement dynamics control system 2 to the control unit 3 via the data bus.

The following list of reference numbers is provided to clarify the specification and drawings of the invention.

LIST OF REFERENCE SYMBOLS

1 Vehicle
2 Vehicle movement dynamics control system
3 Control unit
4 Vehicle occupant protection elements
A Asymmetric low-pass filter
B Evaluation variable
F Evaluation function
G Setpoint yaw moment
$S_1$ First threshold value
$S_2$ Second threshold value
S1 to S3 Measuring sensors
SS1 to SS6$b$ Method steps
Z Intermediate variable The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for preventively actuating a vehicle occupant protection element in a vehicle, comprising:
    monitoring an evaluation variable relating to a state of oversteering in a vehicle movement dynamics control system, the evaluation variable for monitoring the state of oversteering being determined using a manipulated variable of the vehicle movement dynamics control system;
    activating the vehicle occupant protection element upon identifying the state of oversteering; and
    determining selectively applicable brake pressures at individual wheels by using the manipulated variable.

2. A method for preventively actuating a vehicle occupant protection element in a vehicle, comprising:
    monitoring an evaluation variable relating to a state of oversteering in a vehicle movement dynamics control system, the evaluation variable for monitoring the state of oversteering being determined using a manipulated variable of the vehicle movement dynamics control system;
    activating the vehicle occupant protection element upon identifying the state of oversteering;
    determining as an intermediate variable a value of an evaluation function of a fuzzy logic for the manipulated variable; and
    determining as an evaluation variable a result of a low-pass filtering operation of the intermediate variable;
    wherein the low-pass filtering operation is of asymmetrical design.

3. A method for preventively actuating a vehicle occupant protection element is a vehicle, comprising:
    monitoring an evaluation variable relating to a state of oversteering in a vehicle movement dynamics control system, the evaluation variable for monitoring the state of oversteering being determined using a manipulated variable of the vehicle movement dynamics control system;
    activating the vehicle occupant protection element upon identifying the state of oversteering;
    identifying the state of oversteering when the monitored evaluation variable exceeds a first threshold value; and
    rejecting the state of oversteering and deactivating the triggered vehicle occupant protection element when the monitored evaluation variable undershoots a second threshold value.

4. The method as claimed in claim 3, further comprising determining at least one of the first and second threshold values as a function of at least one further parameter.

5. The method as claimed in claim 4, further comprising using as the further parameter at least one of a lateral acceleration, a resulting overall acceleration, a coefficient of friction actually used and a speed of the vehicle.

6. A control system for an occupant protection device of a vehicle, comprising:
- a control unit operatively connected to a vehicle movement dynamics control system of the vehicle; and
- a vehicle occupant protection element preventively actuatable by the control unit; wherein
- the vehicle movement dynamics control system monitors an evaluation variable relating to a state of oversteering, the evaluation variable being determined using a manipulated variable thereof;
- the control unit actuates the vehicle occupant protection element upon identifying the state of oversteering;
- the control unit, to determine the manipulated variable, further determines an intermediate variable using a fuzzy logic evaluation function;
- the evaluation function comprises a low pass filtering operation; and
- the evaluation function comprises an asymmetrical function.

* * * * *